(12) United States Patent
Dondurur et al.

(10) Patent No.: US 8,695,521 B2
(45) Date of Patent: Apr. 15, 2014

(54) VEHICLE FLOTATION SYSTEM

(75) Inventors: Memhet Dondurur, Dhahran (SA); Ahmet Z. Sahin, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 92 days.

(21) Appl. No.: 13/472,216

(22) Filed: May 15, 2012

(65) Prior Publication Data
US 2013/0305977 A1  Nov. 21, 2013

(51) Int. Cl.
*B63B 43/10* (2006.01)

(52) U.S. Cl.
USPC .............................. 114/68; 114/123

(58) Field of Classification Search
USPC ........... 114/68, 123; 440/12.5, 12.51; 73/146; 280/5.514, 86.5, 124.157
See application file for complete search history.

(56) References Cited

U.S. PATENT DOCUMENTS

| | | | |
|---|---|---|---|
| 5,113,779 A | 5/1992 | Amrein et al. | |
| 5,421,283 A * | 6/1995 | Bruggemann et al. | 114/68 |
| 5,682,832 A | 11/1997 | Millard | |
| 6,070,546 A | 6/2000 | Downey et al. | |
| 6,526,900 B2 * | 3/2003 | Redman | 114/68 |
| 6,595,359 B1 | 7/2003 | Allain et al. | |
| 6,798,346 B2 | 9/2004 | Kim | |
| 7,077,714 B2 * | 7/2006 | Brown | 440/12.5 |
| 7,287,482 B1 | 10/2007 | Banchetto et al. | |
| 7,523,713 B2 * | 4/2009 | Farris | 114/68 |
| 2009/0111341 A1 | 4/2009 | Rodriguez | |
| 2009/0242697 A1 | 10/2009 | Schmidt et al. | |
| 2009/0325433 A1 | 12/2009 | Blacklock | |

FOREIGN PATENT DOCUMENTS

| | | |
|---|---|---|
| JP | 11-286213 | 10/1999 |
| WO | WO 03/082666 | 10/2003 |

OTHER PUBLICATIONS

Website, http://flexitank.com.au/subproducts/flotation.html, Flotation and Salvage Devices, one sheet printed from the internet on Nov. 14, 2011.

* cited by examiner

*Primary Examiner* — Lars A Olson
(74) *Attorney, Agent, or Firm* — Richard C Litman

(57) ABSTRACT

The vehicle flotation system is adaptable to a conventional land motor vehicle to provide sufficient buoyancy for the vehicle should it become immersed in water. A plurality of permanently inflated pneumatic elements and/or solid closed-cell (e.g., foam, cork, etc.) elements is installed throughout the bodywork of the vehicle. Such permanently inflated and solid flotation elements do not require a pneumatic inflation system, thus providing benefits in reliability and economy. Optionally, a pneumatic inflation monitoring system may be provided for the pneumatic elements. As an additional option, a plurality of collapsed, inflatable elements may be installed within the vehicle fenders for deployment and inflation in the event of water immersion of the vehicle. These inflatable elements are automatically ejected laterally from slots or openings in the vehicle fenders and are automatically inflated by an on-board container of compressed gas, in the event of water immersion of the vehicle.

14 Claims, 4 Drawing Sheets

VEHICLE FLOTATION SYSTEM

BACKGROUND OF THE INVENTION

1. Field of the Invention

The present invention relates generally to motor vehicles, and particularly to a vehicle flotation system for keeping such vehicles afloat in the event that they become immersed in water.

2. Description of the Related Art

Conventional land or ground motor vehicles are not adapted for immersion in water. While a very limited number of special use land vehicles have been constructed or manufactured to permit their limited use as watercraft, it is generally impractical to adapt the structure of a conventional land motor vehicle to provide for flotation solely due to displacement by the body shell. Normally this is of no great consequence, as the normal operating environment of such land vehicles precludes their immersion in water. The vast majority of such vehicles never experience more than a couple of inches of rainwater in a puddle, or perhaps the fording of a very shallow stream.

Nonetheless, there are emergency situations in which such land vehicles may encounter deeper water. One such example is during flash flood conditions, when a river or stream suddenly overflows its banks. This can result in water levels suddenly increasing to several feet within a minute or less, as water floods down a street, road, or canyon. The occasional large volume burst water main can produce similar conditions in a very localized area. Such emergencies can result in an automobile or other vehicle being quickly washed away and/or submerged, through no fault of the motorist.

In addition, there have been numerous occasions where a motorist inadvertently allows his or her vehicle to enter a large and relatively deep body of water. Such accidents have been known to occur when the motorist takes a wrong turn on a dark night and inadvertently drives into a river or lake, or perhaps when the vehicle suffers a mechanical failure (e.g., loss of the brakes) that allows the vehicle to enter the water against the attempts of the motorist to stop the vehicle. Accidents wherein one or more vehicles are pushed into a body of water after a collision have also been known to occur.

As a result of the above, there has been some interest in providing land motor vehicles with some form of flotation means to prevent the vehicle from sinking after immersion in a body of water, or to salvage the vehicle after such immersion or submersion. An example of such is found in Japanese Patent No. 11-286,213, published on Oct. 19, 1999. This publication describes (according to the drawings and English abstract) an automobile safety system having water and impact sensors that will open the door glass and/or sunroof of the vehicle when activated. The system will also inflate a normally uninflated float to add some buoyancy to the vehicle.

None of the above inventions and patents, taken either singly or in combination, is seen to describe the instant invention as claimed. Thus, a vehicle flotation system solving the aforementioned problems is desired.

SUMMARY OF THE INVENTION

The vehicle flotation system includes a plurality of solid and/or permanently inflated pneumatic flotation elements installed throughout the vehicle. The solid flotation elements may comprise closed cell foam plastic and/or natural closed cell material, e.g., cork, etc. The permanently inflated pneumatic flotation elements may comprise pneumatic containers having hollow shells of flexible or rigid plastic or metal. Such flotation elements require no additional pneumatic inflation system, thus simplifying the system for greater reliability and economy. However, a low-pressure detection system may also be installed to measure the pressure within the permanently inflated pneumatic elements, if those pneumatic elements are permanently inflated to a pressure at least slightly higher than ambient.

Optionally, inflatable devices may be stored within portions of the vehicle bodywork, e.g., laterally within the fenders of the vehicle. These devices may be ejected laterally from the fenders and inflated automatically if the vehicle becomes immersed in water for additional buoyancy for the vehicle. The water immersion detection means and the inflation means for such inflatable elements are conventional and well known in the art.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The vehicle flotation system comprises a number of flotation elements installed within a motor vehicle, such as an automobile or the like. The flotation elements provide sufficient buoyancy for the motor vehicle to keep the motor vehicle afloat in the event that it becomes immersed in water. The flotation elements may comprise solid units of natural or synthetic closed cell foam material, e.g., expanded polystyrene foam, cork, etc., hollow pneumatic shells of rigid plastic or metal, and/or permanently inflated or inflatable pneumatic units.

Figure 1:
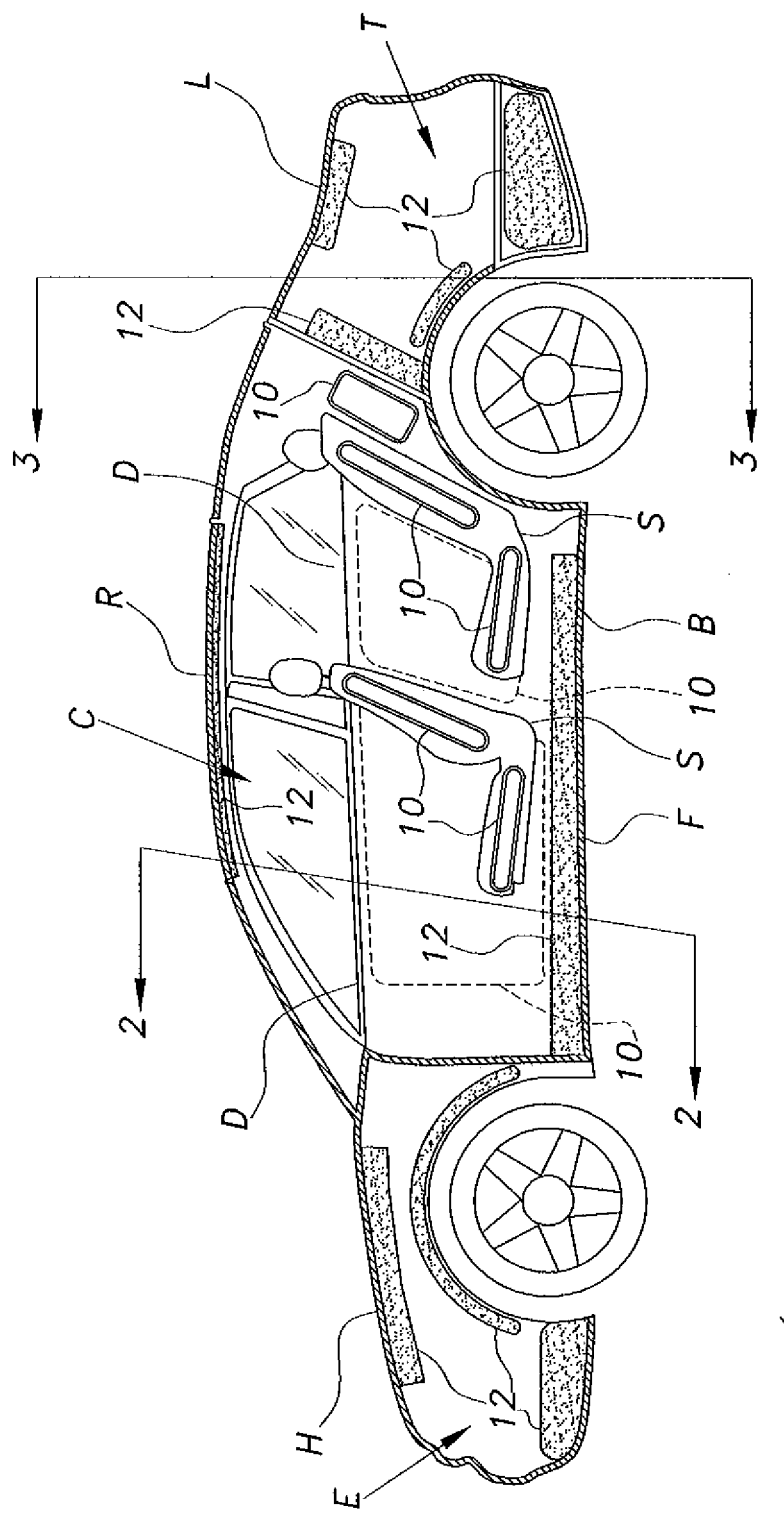
FIG. 1 is a left side elevation view in section of a vehicle flotation system according to the present invention, illustrating an exemplary installation of flotation units within the motor vehicle.

FIG. 1 of the drawings provides a left side elevation view of an exemplary passenger automobile A equipped with a plurality of flotation elements installed therein. It will be understood that the depicted passenger automobile A is exemplary, and that the flotation elements and system may be adapted to a wide range of motor vehicles, including, but not limited to, pickup trucks, light vans, and other motor vehicles. The basic structure of the automobile A is conventional. The automobile A includes a body or bodywork B having a passenger compartment C, a plurality of passenger seats S installed within the passenger compartment C, a plurality of passenger doors D, a floor F, a roof R, left and right hollow rocker panels P (shown in section in FIG. 2), a plurality of fenders N (shown in section in FIG. 3), a forwardly disposed engine compartment E enclosed by a hood H, and a rearwardly disposed trunk compartment T enclosed by a trunk lid L. The engine compartment E and trunk T comprise auxiliary compartments separate from the passenger compartment C, and it will be understood that the engine compartment may be in the rear of the automobile A with the trunk T to the front of the vehicle, depending upon the vehicle configuration as manufactured.

Generally speaking, the various interior spaces and compartments of the vehicle or automobile A may be considered as two types. The seats S, the doors D, and the rocker panels P all define a series of enclosed protective volumes, i.e., the interiors of these various components are not exposed to the elements or to the activities of persons within the vehicle. The floor F, the roof R, the engine compartment E and the trunk T comprise the auxiliary compartments, and the hood H and trunk lid L define exposed volumes, i.e., exposed to the elements and/or to the actions of persons within the vehicle. The type of flotation element installed in each of these areas or volumes is preferably in accordance with the protection provided by the volume, either enclosed protective or exposed.

Figure 2:
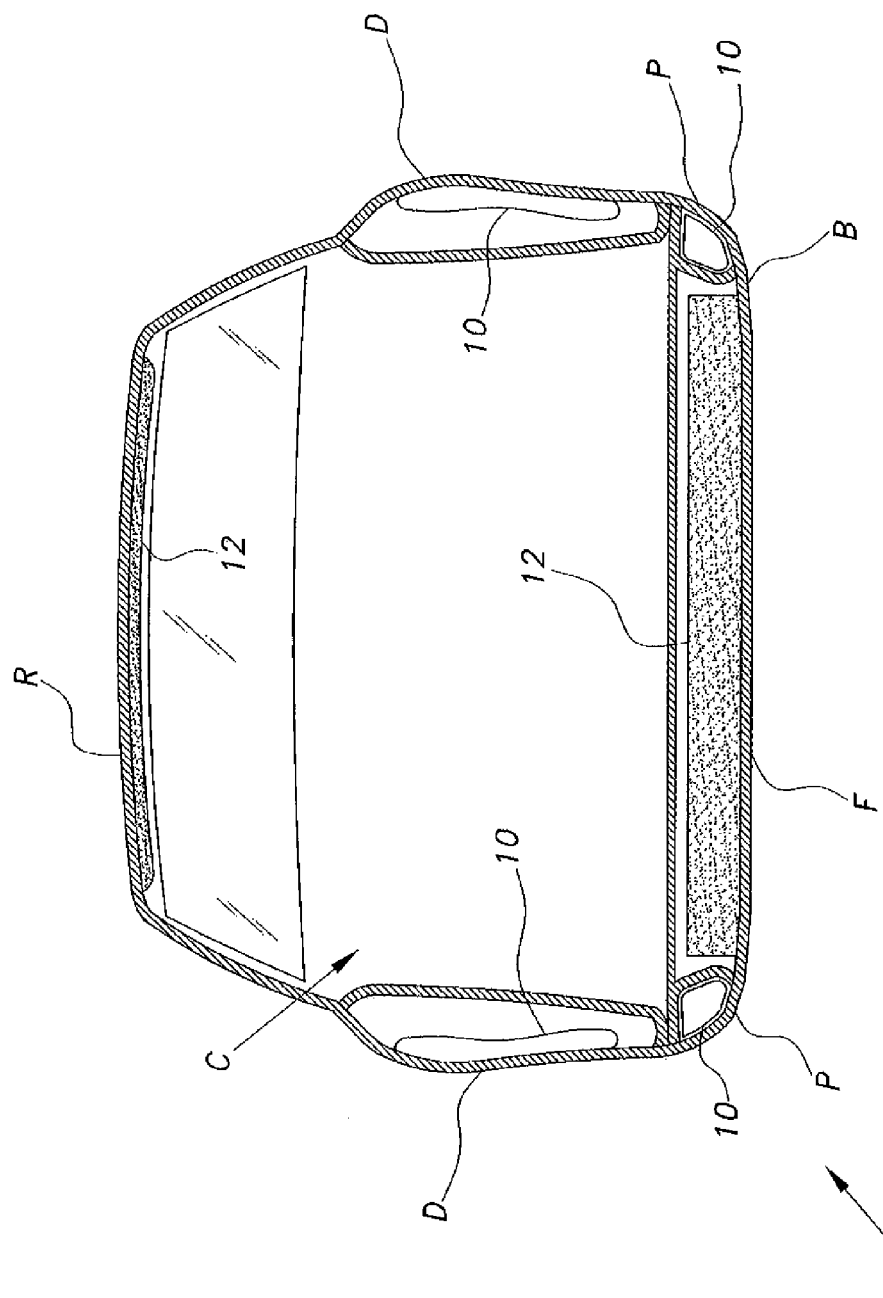
FIG. 2 is a section view along lines 2-2 of FIG. 1.

The left side view in section of FIG. 1 and the section view of FIG. 2 illustrate a number of different flotation elements installed within the motor vehicle or automobile A. In the example of FIGS. 1 and 2, the seats S, the doors D, and the rocker panels P define a plurality of enclosed protective volumes. Each of these volumes has at least one permanently inflated pneumatic flotation element installed therein. The pneumatic flotation elements installed within these enclosed protective volumes may comprise pneumatically sealed containers 10 of flexible or rigid material, e.g., vinyl plastic, thin sheet metal, etc. As these flotation elements 10 are permanently inflated, they do not require the additional complexity of an inflation system to inflate them in the event of immersion of the vehicle, thus reducing cost and increasing reliability of the system.

On the other hand, there are several areas within the vehicle that are exposed to the elements, or at least exposed to the activities of persons within the vehicle. These exposed volumes comprise the vehicle floor F, the roof R, and the interiors of the engine compartment E and trunk T and their respective hood H and trunk lid L. These various volumes and structures are either exposed to the elements, e.g., the interior of the engine compartment E and its hood H, or exposed to the activities of persons using the vehicle, e.g., the interior of the floor F, the trunk T interior and its lid L, and the lining of the roof R. These exposed volumes are subject to wear and tear due to the elements (i.e., the interior of the engine compartment E) or due to the activities of the occupants of the vehicle and/or articles carried within the vehicle (i.e., the various exposed surfaces within the passenger compartment C and the trunk T). Accordingly, these volumes are preferably equipped with solid flotation elements 12 that retain their buoyancy in the event that they are slightly damaged, e.g., their surface is penetrated by some object or another. These solid flotation elements 12 may comprise closed cell materials of plastic or other synthetic material, e.g., polystyrene and/or polyethylene foam, etc., or natural closed cell material, such as cork or the like. These closed cell flotation elements is retain their buoyancy in the event of damage.

Figure 3:
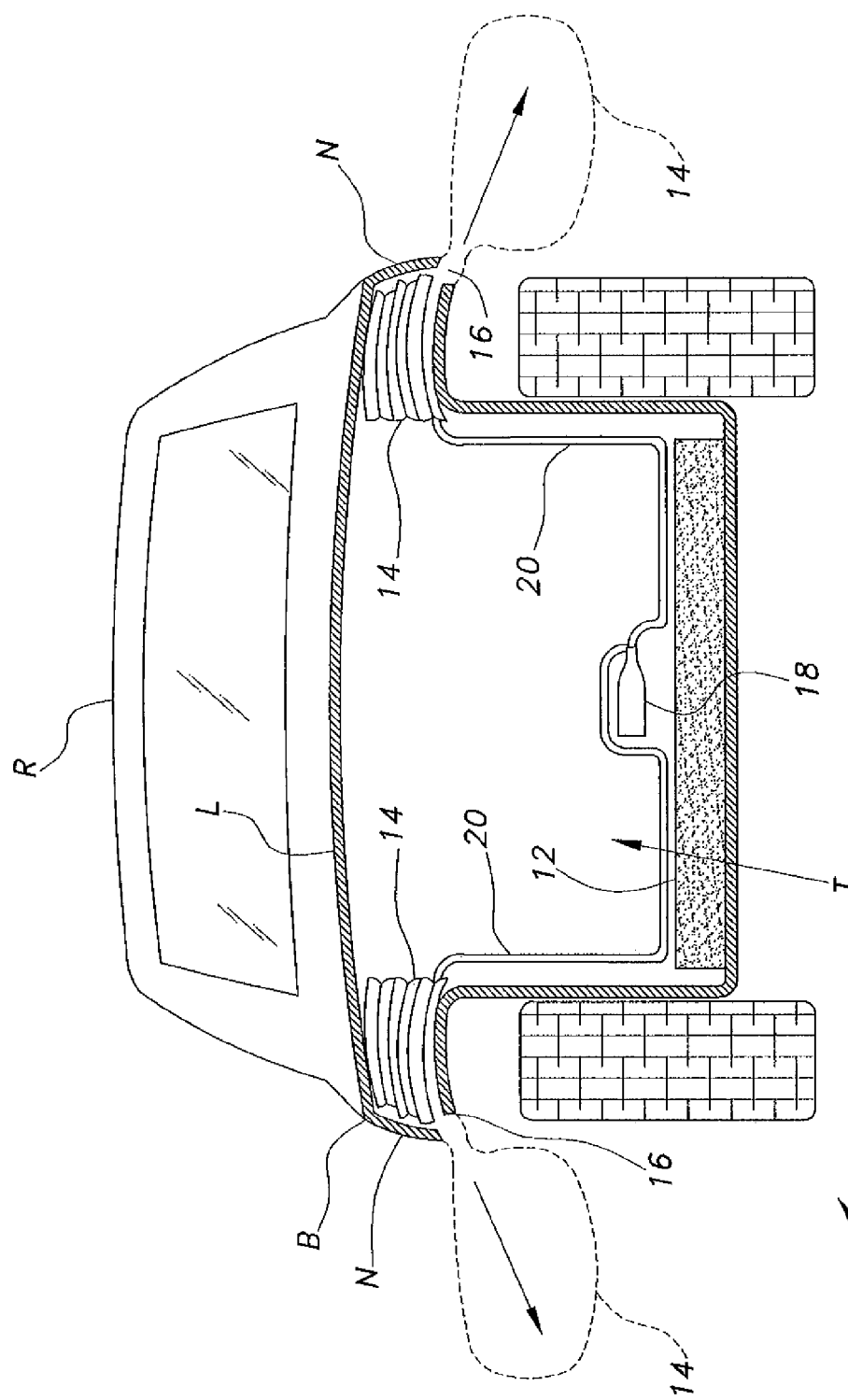
FIG. 3 is a section view along lines 3-3 of FIG. 1.

FIG. 3 of the drawings illustrates another configuration that may be used for at least some of the flotation elements of the vehicle or automobile A. In FIG. 3, collapsed, selectively inflatable pneumatic flotation elements 14 are permanently installed within laterally opposed fenders N of the automobile A. Each of the adjacent fender lips or edges includes a slot 16 formed therein, which provide passages to allow the inflatable elements 14 to escape laterally to the exterior of the vehicle A from their stored locations within the vehicle when they are inflated. By forming these fender slots or passages 16 as a gap between the outer edge of the fender liner and the fender lip disposed immediately outward therefrom, the slots or passages 16 are not readily visible from the exterior of the vehicle and do not detract from the appearance of the vehicle.

A source of compressed gas, e.g., a bottle 18 of compressed air, nitrogen, carbon dioxide, etc., is provided within the trunk T or other convenient area of the automobile A, generally as shown in FIG. 3 of the drawings. The compressed gas within the bottle or container 18 flows to the selectively inflatable pneumatic flotation elements 14 by means of suitable delivery lines or tubing 20. The actuation mechanism for releasing the gas from the bottle or container 18 to inflate the elements 14 may be any suitable conventional system. When the system senses that the vehicle A is immersed in water, the air or other gas contained within the bottle or container 18 is released, thereby blowing the pneumatic elements 14 outward from their stored locations within the fenders N and through the slots or passages 16 to deploy generally as shown in broken lines in FIG. 3.

Figure 4:
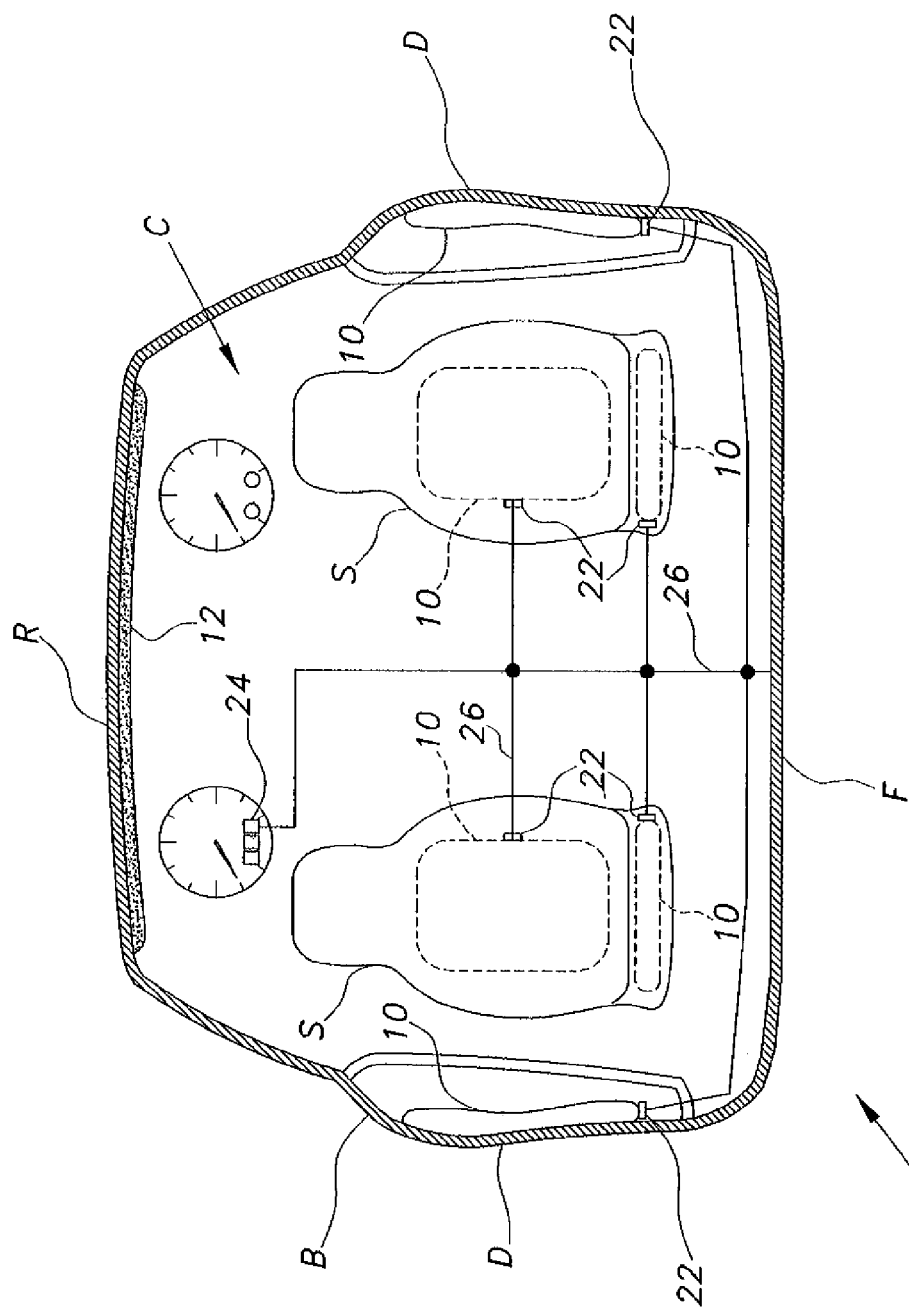
FIG. 4 is an elevation view in section similar to FIG. 2, but including a schematic diagram of an exemplary status warning system for the inflatable or permanently inflated flotation units of the vehicle.

The various permanently inflated flotation elements 10 disposed in the various enclosed protective volumes within the automobile or vehicle A may still be subject to damage or eventual deterioration, even when well protected. Accordingly, FIG. 4 of the drawings illustrates an exemplary system for monitoring the integrity of the pneumatic flotation elements 10 of the vehicle. Each of the permanently inflated flotation units 10 is inflated at the time of installation to a pressure at least slightly higher than ambient. In the event of damage to any of these flotation elements 10, the internal pressure will leak out to lower the internal pressure to ambient. Accordingly, a pressure sensor 22 is installed with each of the pneumatic flotation elements 10, communicating pneumatically therewith to sense the internal pressures of the elements. These sensors 22 communicate with a low-pressure annunciator 24 by means of an appropriate communications network 26, e.g., electronic lines or wires extending from each of the low-pressure sensors 22 to the annunciator 24. The annunciator 24 may be installed within the conventional instrumentation of the automobile A illustrated schematically in FIG. 3, or elsewhere within the vehicle. The annunciator 24 may provide a general alert that there is a problem with the pneumatic system, or each pneumatic flotation element 10 may provide a discrete signal for the annunciator 24 to alert the vehicle operator of a problem with a specific flotation unit. Such electropneumatic sensors and annunciators are conventional.

Accordingly, in the event that the automobile A becomes immersed in water for whatever reason, the combination of various closed cell, permanently inflated, and selectively inflatable flotation elements provide sufficient buoyancy for the vehicle to allow the occupants of the vehicle to escape without danger. The vehicle has sufficient buoyancy to float reasonably high in the water, due to the various flotation elements provided therein. As the flotation elements are all closed units, the vehicle is capable of floating indefinitely until the occupants can be rescued. The buoyancy provided allows the vehicle to be towed by a watercraft to a safe location where it may be grounded or beached, or alternative rescue of the occupants provided according to the circumstances.

It is to be understood that the present invention is not limited to the embodiments described above, but encompasses any and all embodiments within the scope of the following claims.

We claim:
1. A vehicle flotation system, comprising:
a plurality of permanently inflated pneumatic flotation elements adapted for permanent installation within a motor vehicle;

a plurality of solid, closed cell inflation elements adapted for permanent installation within a motor vehicle;
a plurality of pressure sensors communicating pneumatically with each of the permanently inflated pneumatic flotation elements; and
an annunciator communicating with each of the pressure sensors.

2. The vehicle flotation system according to claim 1, further comprising:
a plurality of collapsed, selectively inflatable pneumatic flotation elements adapted for permanent installation within a motor vehicle and for selective external deployment and inflation from the motor vehicle; and
a source of compressed gas pneumatically communicating with each of the selectively inflatable pneumatic flotation elements.

3. The vehicle flotation system according to claim 1, further comprising a motor vehicle having bodywork, the bodywork including a passenger compartment, a plurality of seats disposed within the passenger compartment, a plurality of doors, a floor, a roof, left and right hollow rocker panels, a plurality of fenders, at least one auxiliary compartment disposed externally from the passenger compartment, and an auxiliary compartment cover, the plurality of flotation elements being permanently disposed within the doors, along the floor and the roof, within the rocker panels and fenders, within the at least one auxiliary compartment, and along the auxiliary compartment cover.

4. The vehicle flotation system according to claim 3, wherein:
the seats, the doors, and the rocker panels define a plurality of enclosed protective volumes, at least one of the permanently inflated pneumatic flotation elements being installed within each of the enclosed protective volumes; and
the floor, the roof, the at least one auxiliary compartment, and the auxiliary compartment cover define a plurality of exposed volumes, at least one of the solid, closed-cell inflation elements being installed with each of the exposed volumes.

5. The vehicle flotation system according to claim 3, wherein each of the fenders of the motor vehicle has a flotation element deployment passage disposed therein, the floatation system further comprising:
a plurality of collapsed, selectively inflatable pneumatic flotation elements disposed within the fenders of the motor vehicle, adjacent to a corresponding one of the deployment passages; and
a source of compressed gas pneumatically communicating with each of the selectively inflatable pneumatic flotation elements.

6. A vehicle flotation system, comprising:
a plurality of collapsed, selectively inflatable pneumatic flotation elements adapted for permanent installation within a motor vehicle and for selective external deployment and inflation from the motor vehicle;
a source of compressed gas pneumatically communicating with each of the selectively inflatable pneumatic flotation elements;
a plurality of pressure sensors communicating pneumatically with each of the selectively inflated pneumatic flotation elements; and
an annunciator communicating with each of the pressure sensors.

7. The vehicle flotation system according to claim 6, further comprising:

a plurality of permanently inflated pneumatic flotation elements adapted for permanent installation within a motor vehicle; and
a plurality of solid, closed cell inflation elements adapted for permanent installation within a motor vehicle.

8. The vehicle flotation system according to claim 7, further comprising a motor vehicle having bodywork, the bodywork including a passenger compartment, a plurality of seats disposed within the passenger compartment, a plurality of doors, a floor, a roof, left and right hollow rocker panels, a plurality of fenders, at least one auxiliary compartment disposed externally from the passenger compartment, and an auxiliary compartment cover, the plurality of flotation elements being permanently disposed within the doors, along the floor and the roof, within the rocker panels and fenders, within the at least one auxiliary compartment, and along the auxiliary compartment cover.

9. The vehicle flotation system according to claim 8, wherein:
the seats, the doors, and the rocker panels define a plurality of enclosed protective volumes;
at least one of the permanently inflated pneumatic flotation elements is installed within each of the enclosed protective volumes;
the floor, the roof, the at least one auxiliary compartment, and the auxiliary compartment cover define a plurality of exposed volumes; and
at least one of the solid, closed-cell inflation elements is installed with each of the exposed volumes.

10. The vehicle flotation system according to claim 8, wherein:
each of the fenders of the motor vehicle has a flotation element deployment passage disposed therein; and
one of the collapsed, selectively inflatable pneumatic flotation elements is disposed within each of the fenders of the motor vehicle, adjacent to a corresponding one of the deployment passages.

11. A vehicle flotation system, comprising:
a motor vehicle having bodywork, the bodywork including a passenger compartment, a plurality of seats disposed within the passenger compartment, a plurality of doors, a floor, a roof, left and right hollow rocker panels, a plurality of fenders, at least one auxiliary compartment disposed externally from the passenger compartment, and an auxiliary compartment cover; and
a plurality of flotation elements permanently disposed within the doors, along the floor and the roof, within the rocker panels and fenders, within the at least one auxiliary compartment, and along the auxiliary compartment cover;
a plurality of pressure sensors communicating pneumatically with each of the flotation elements; and
an annunciator communicating with each of the pressure sensors.

12. The vehicle flotation system according to claim 11, wherein the plurality of flotation elements comprises a plurality of permanently inflated pneumatic flotation elements and a plurality of solid, closed-cell inflation elements.

13. The vehicle flotation system according to claim 12, wherein:
the seats, the doors, and the rocker panels define a plurality of enclosed protective volumes, at least one of the permanently inflated pneumatic flotation elements being installed within each of the enclosed protective volumes; and
the floor, the roof, the at least one auxiliary compartment, and the auxiliary compartment cover define a plurality of exposed volumes, at least one of the solid, closed-cell inflation elements being installed with each of the exposed volumes.

14. The vehicle flotation system according to claim 11, wherein each of the fenders of the motor vehicle has a flotation element deployment passage disposed therein, the floatation system further comprising:

a plurality of collapsed, selectively inflatable pneumatic flotation elements disposed within the fenders of the motor vehicle adjacent to a corresponding one of the deployment passages; and a source of compressed gas pneumatically communicating with each of the selectively inflatable pneumatic flotation elements.

* * * * *